United States Patent [19]
Inada et al.

[11] 3,809,437
[45] May 7, 1974

[54] ANTI-SKID BRAKE CONTROL SYSTEM

[75] Inventors: Masami Inada, Kariya; Masamoto Ando, Toyohashi, both of Japan

[73] Assignee: Aisin Seiki Kabushiki Kaisha, Kariya-shi, Aichi-ken, Japan

[22] Filed: Sept. 25, 1972

[21] Appl. No.: 292,153

[30] Foreign Application Priority Data
Sept. 25, 1971  Japan.............................. 46-74908

[52] U.S. Cl............................. 303/21 F, 188/181 A
[51] Int. Cl................................................ B60t 8/06
[58] Field of Search........................ 303/21, 61–63, 303/68–69; 188/181

[56] References Cited
UNITED STATES PATENTS
3,066,988  12/1962  McRae .............................. 303/21 F
3,480,335  11/1969  Inada................................ 303/21 F
3,667,811  6/1972  Okamoto et al................... 303/21 F

*Primary Examiner*—Duane A. Reger
*Assistant Examiner*—D. C. Butler
*Attorney, Agent, or Firm*—Oblon, Fisher, Spivak, McClelland & Maier

[57] ABSTRACT

An improved anti-skid brake control system of the type comprising a cut-off valve and a hydraulic capacity controller disposed within a hydraulic braking circuit connecting a master cylinder with wheel brake cylinders, wherein in an anti-skid operation, the cut-off valve first blocks passage of pressurized fluid from the master cylinder to the wheel cylinders, and then the capacity controller is conditioned for its pressure decreasing operation for effecting the anti-skid operation. The system further comprises a skid sensor for generating first and second signals therefrom in response to wheel locking conditions, a first servomotor for pneumatically actuating the cut-off valve, a second servomotor for pneumatically actuating the capacity controller, a first pneumatic selector valve electrically operated by the first signal to operate the servomotors, a second pneumatic selector valve electrically operated by the second signal during the activation of the first selector valve to accelerate the operation of the servomotors, and a control valve to regulate the operation of the servomotors.

12 Claims, 1 Drawing Figure

PATENTED MAY 7 1974 3,809,437
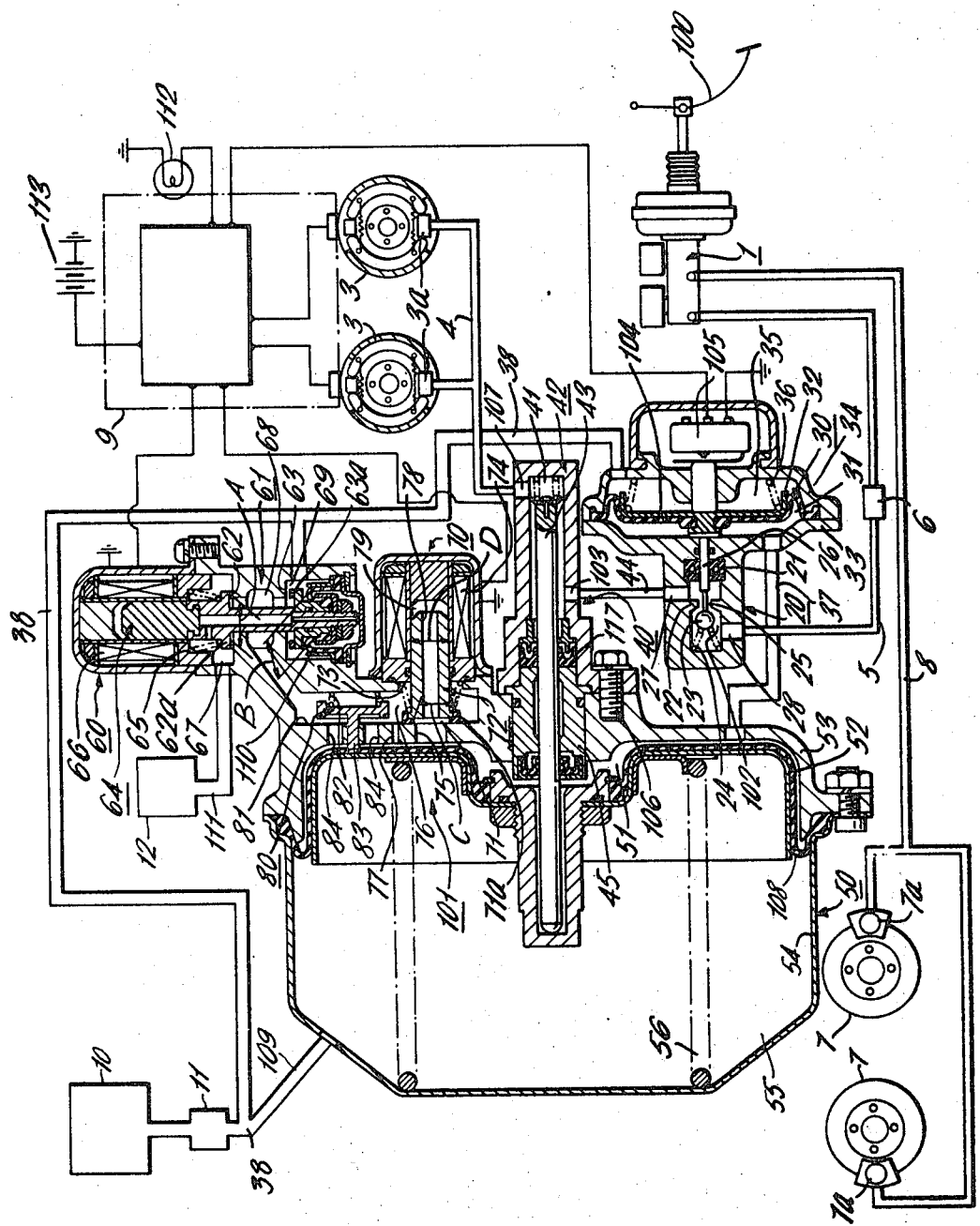

ANTI-SKID BRAKE CONTROL SYSTEM

BACKGROUND OF THE INVENTION

The present invention relates generally to anti-skid brake control systems, and more particularly to a novel improvement of the system of a type comprising a cut-off valve and a hydraulic capacity controller disposed within a hydraulic braking circuit connecting a master cylinder with wheel brake cylinders, wherein in an anti-skid operation, the cut-off valve blocks passage of hydraulic pressure from the master cylinder to the wheel brake cylinders and then the capacity controller is conditioned for its pressure decreasing operation for effecting the anti-skid operation.

An anti-skid brake control mechanism of the character described herein is disclosed in U. S. Pat. No. 3,667,811, including pneumatic control means for regulating the cut-off valve and the capacity controllers. To more efficiently avoid the dangerous and tragic results caused by skidding, even more effective control can well be expected from the aforementioned type of mechanism. Such features can be described as being:

1. Anti-skid operation in accordance with tire-road interface conditions;
2. More hermetic and shorter communication for a pneumatic operation medium for quicker and more accurate operation response; and
3. Smoother pneumatic control wherein there is produced no undesired pneumatic resistance.

SUMMARY OF THE INVENTION

A primary object of the present invention is, therefore, to provide an anti-skid brake control system capable of operation properly in accordance with tire-road interface conditions.

Another object of the present invention is to provide an anti-skid brake control system, having the above-mentioned characteristics, wherein a hermetic passage of a substantially minimized length is realized for a pneumatic operation medium.

A further object of the present invention is to provide an anti-skid brake control system, having the above-mentioned characteristics, wherein hydraulic control means are designed to substantially eliminate possible undesired pneumatic reactions thereon.

A still further object of the present invention is to provide an anti-skid brake control system, having the above-mentioned characteristics, wherein the main components are integrally and hermetically assembled to be very compact so as to reduce the installation space and the production cost and more particularly to better effect the hermetic and short pneumatic passage.

According to the present invention, briefly summarized, in a vehicle having a master cylinder, wheel brake cylinders and a hydraulic braking circuit to supply pressurized fluid to the wheel brake cylinders from the master cylinder, there is provided an anti-skid brake control system which comprises a cut-off valve disposed within the circuit for selectively blocking the pressure communication between the master cylinder and wheel brake cylinders, and a hydraulic capacity controller interposed between the cut-off valve and the wheel brake cylinders within the circuit for decreasing the pressurized fluid from the master cylinder on activation of the cut-off valve. The anti-skid brake control system further comprises a skid sensor for generating first and second signals therefrom in response to wheel locking conditions; a first servomotor for pneumatically controlling the cut-off valve, the first servomotor including a spring loaded diaphragm piston to establish first and second chambers; a second servomotor for pneumatically actuating the capacity controller, the second servomotor including a spring loaded diaphragm piston, which is reciprocable therein and dimensionally larger than the diaphragm piston of the first servomotor, to establish first and second chambers, the former of which is pneumatically in open communication with the first chamber of the first servomotor; a first pneumatic selector valve electrically operated in accordance with the first signal from the skid sensor and for selectively connecting the first chamber of the second servomotor with a pneumatic pressure source to activate the second servomotor; a second pneumatic selector valve electrically operated in response to the second signal from the skid sensor for connecting the first chamber of the second servomotor with the pneumatic pressure source during the activation of the first selector valve so as to cause a maximum pneumatic communication between the pressure source and the first chamber of the second servomotor; and a control valve or a check valve disposed within a communication passage formed between the first selector valve and the first chamber of the second servomotor for changing over from large to small the communication between the first selector valve and the first chamber of the second servomotor in response to the initial operation of the second servomotor.

BRIEF DESCRIPTION OF THE DRAWING

The above and other objects, features and attendant advantages of the present invention will be more fully appreciated as the same becomes better understood from the following detailed description of the preferred embodiment when considered in connection with the accompanying drawing in which the sole FIGURE shows an elevational sectional view of a preferred embodiment in accordance with the present invention.

DESCRIPTION OF THE PREFERRED EMBODIMENT

Referring now to the drawing, a preferred embodiment of the present invention comprises a first hydraulic circuit formed with a master cylinder 1 operatively connected to a foot brake pedal 100 and a hydraulic conduit 8 in direct connection with front wheel brake cylinders 7a of front wheel 7. Disc brakes are usually applied for the front wheels 7. A second hydraulic circuit is also provided for this system, which includes the master cylinder 1, a hydraulic conduit 5 having a conventional pressure control valve 6 disposed therein, a cut-off valve 20 in connection with the conduit 5, a hydraulic conduit 44 leading from the cut-off valve 20 to a hydraulic capacity controller 40, and a hydraulic conduit 4 extending from the hydraulic capacity controller to rear wheel brake cylinders 3a of rear wheels 3. Shoe/drum brakes are usually used for the rear wheels 3.

The system further comprises a first servomotor 30 for operating the cut-off valve 20 to open and close the second circuit, a second servomotor 50 to regulate the capacity controller 40 for decreasing hydraulic pressure supply to the rear wheel brake cylinders 3a when the rear wheels 3 are locked, a first pneumatic selector valve 60 to regulate the second servomotor 50, a second pneumatic selector valve 70 for boosting up the operation of the second servomotor 50 in accordance with the operation of the first selector valve 60 and to finally regulate the second servomotor 50. The first and second servomotors 30 and 50 are in open communication to each other by way of a conduit 37, so that the first servomotor 30 is always operated prior to the operation of the second servomotor 50 due to a capacity difference between the two servomotors 30 and 50.

A skid sensor 9 is also provided in operative connection with the rear wheels 3 for issuing a first signal in a first predetermined locked condition of the rear wheels 3 and a second signal in a second predetermined locked condition of the rear wheels 3. The second locked condition represents a wheel-locking degree excessive over that of the first locked condition. The sensor 9 includes an alarm lamp 112 and a current source 113.

The cut-off valve 20 comprises a housing 33 which is provided with a cylindrical interior or pressure chamber 102 therein. The pressure chamber 102 includes an annular valve seat 22 forming a hole 25. The housing 33 is further provided with ports 27 and 28 thereon, the port 28 being connected to the conduit 5 and the port 27 to the conduit 44. A ball valve 23 is normally biased by a spring 24 toward the valve seat 22 within the pressure chamber 102. The ball valve 23 is normally held apart from the valve seat 22 by way of a push rod 26 axially slidable through a seal member 21 and the base wall of the housing 33.

The first servomotor 30 comprises a casing 34 which is hermetically integrated with the housing 33 of the cut-off valve 20. A first power piston 32 is reciprocably disposed within the interior of the casing 34 and is normally biased to urge the push rod 26 for keeping the ball valve 23 apart from the seat 22 by means of a spring 36. The interior of the casing 34 is divided into two chambers 31 and 35 by a diaphragm 104, which adheres to the first power piston 32. The chamber 35 is connected to a vacuum source 10 of an intake-manifold through a conduit 38 and a check valve 11. The chamber 31 is connected to the second servomotor 50 through the conduit 37. The first servomotor 30 includes a sensor 105 wired to the skid sensor 9 for checking the positive operation of the ball valve 23.

The second servomotor 50 includes a body member 53, a casing 54, and a second power piston 52 movable within the interior formed by the body member 53 and the casing 54. A diaphragm 108 fixed on the second power piston 52 divides the interior hermetically into two chambers 51 and 55. The chamber 51 is in connection with the chamber 31 of the first servomotor 30 through the conduit 37. The chamber 55 is connected to the conduit 38 through a branch conduit 109 and is always supplied with vacuum from the vacuum source 10. A return spring 56 is provided to normally bias the second power piston toward the chamber 51.

The hydraulic capacity controller 40 comprises a housing 42 hermetically integrated with the body member 53 of the second servomotor 50 by bolt members 106. The housing 42 is provided with ports 103 and 107 being respectively connected to the conduits 44 and 4.

A plunger 43 is axially movable within the housing 42, the plunger 43 being supported by a seal member 117 and a guide member 45. One end of the plunger 43 stays within a chamber 41 of the housing 42 and the other end extends into the second servomotor 50 to be operatively connected with the second power piston 52.

The first pneumatic selector valve 60 shown in the upper portion of the FIGURE is for controlling pneumatic pressure within the chambers 31 and 51 respectively of the first and second servomotors 30 and 50. A body member 61 of the selector valve 60 is formed integrally with the body member 53 of the second servomotor 50. The valve body member 61 is provided therein with valve seats 62 and 63, valve chambers 67 and 69, and an intermediate chamber 68. A plunger valve 64 formed with valves 62a and 63a moves slidably through the chambers 67, 68 and 69. The valve 62a normally sits on the seat 62 within the chamber 67, while the valve 63a is normally held apart from the seat 63 within the chamber 69. A diaphragm 110 is provided between the valve 63a and body member 61 so as to hermetically divide the chamber 69 into two sections. One section on the side of valve seat 63 is in communication with the vacuum source 10 by way of the conduit 38 and the other sections is in communication with the atmosphere.

The cross-sectional area A of the effective diameter of the valve 62a is designed to be approximately equal to B, or that of the effective diameter acting on both sides of the diaphragm 110, so that the vacuum and the atmospheric pressure do not cause any direct resistance in the operation of the plunger valve 64. The selector valve 60 further includes a sealing spring 65 for the valve 62a and a solenoid 66 to be energized by means of the first signal from the skid sensor 9. The chamber 68 is constantly open to the vacuum conduit 38 and is connected with the chamber 67 when the valve 62a is raised from the valve seat 62. The chamber 67 is in communication with an air cleaner 12 through a conduit 111.

The second selector valve 70 is operated only when the second signal or a large wheel-locking signal is generated from the skid sensor 9. This selector valve 70 is integrally secured on the integral body members 61 and 53 of the first selector valve 60 and the second servomotor 50, respectively. Provided within the selector valve 70 are chambers 76 and 79, a solenoid 74, and a plunger valve 72 including a valve 71a and an axial hold 78. The plunger valve 72 is normally biased by a spring 73 so as to have the valve 71a sit on a valve seat 71. Thus, a hole 75 drilled on the body member 53 of the second servomotor 50 is normally closed by the plunger valve 72. The cross-sectional areas of the effective diameters C and D respectively of the valve 71a and the plunger valve 72 are designed to be alike. This design, as well as that of the hole 78 and the chamber 79, help to keep the vacuum or the atmospheric pressure from acting directly on the plunger 72. When the solenoid 74 is energized by the second signal from the skid sensor 9, the hole 75 is opened to complete communication between the chambers 51 and 76 respectively of the second servomotor 50 and the selector valve 70. The chamber 76 is constantly open, however, to the chamber 51 through another smaller orifice 77 provided on the body member 53 of the second servomotor 50.

The control valve 101 comprises a check valve 80 disposed within the space or passageway formed by the body members 53 and 61 respectively of the second servomotor 50 and the first selector valve 60. A spring 82 urges the valve 80 toward a valve seat 81. The end of a rod 83 extending from the valve 80 is in contact with the second power piston 52. Thus, the valve 80 normally opens holes 84 drilled through the body member 53 of the second servomotor 50, and is operative to make communication between the chamber 76 of the second selector valve 70 and the chamber 51 of the second servomotor 50 by way of the holes 84, the chamber 76 being also connected with the intermediate chamber 68 of the first selector valve 60.

Described below are operations of the anti-skid system of the preferred embodiment of this invention. First, the operation is related covering the normal braking operation when the rear wheels are not locked. Depressing actuation on the foot pedal 100 produces hydraulic braking pressure within the master cylinder 1, which is delivered to the front wheel brake cylinders 7a through the conduit 8 so that a braking effect operates on the front wheels 7. At the same time, the hydraulic braking pressure within the master cylinder 1 is delivered to the rear wheel cylinders 3a through the conduit 5, the pressure control valve 6, the chamber 102 of the cut-off valve 20, the conduit 44, the chamber 41 of the capacity controller 40, and the conduit 4, such that braking operation is produced also on the rear wheels 3. During this braking operation, the first and second servomotors 30 and 50 remain inoperative. Thus, in the first servomotor 30, the ball valve 23 is kept apart from the seat 22 by way of the spring 36 through the first power piston 32 and the push rod 26, even when the braking pressure is supplied into the chamber 102, and although the braking pressure is supplied therefrom into the chamber 41 of the capaCity controller 40 through conduit 44, the plunger 43 thereof remaIns unmoved because of the resilient force of the spring 56 of the second servomotor 50 acting through the second power piston 52.

In such braking operations as cause locking on the rear wheels 3, the skid sensor 9 senses the wheel locking and detects the degree of the locking. When the locking degree is rather small, the solenoid 66 of the first selector valve 60 is energized by the first signal from the sensor 9. Then, the plunger valve 64 is attracted upwardly, as seen in the FIGURE, against the biasing force of the spring 65 so as to open the valve 62a and close the valve 63a. This causes the intermediate chamber 68 to communicate with the chamber 67, which is in communication with the pressure source 12, and the communication between the intermediate chamber 68 and the chamber 69 to be blocked. Then pneumatic high pressure from the air cleaner 12 is fed into the chamber 51 of the second servomotor 50 by way of the chambers 67, 68 and 76 and the holes 84, thereby increasing the pressure within chamber 51 very quickly and creating a pressure difference between the chambers 51 and 55 within the second servomotor 50, so that the second power piston 52 is urged to the left, as seen in the FIGURE.

Prior to the above-mentioned operation of the second power piston 52 of the second servomotor 50, the pneumatic pressure delivered into the chamber 51 is delivered into the chamber 31 of the first servomotor 30 through the conduit 37 so as to first operate the first power piston 32. This is caused by the fact that the facility of the first servomotor 30 is smaller than the facility of the second servomotor 50 and that the pressure difference in the first servomotor 30 is equal to that within the second servomotor 50. In other words, the first servomotor 30 has the same pressure difference therein as that in the second servomotor 50 and the spring 36 has less resilient force than the spring 56, or the first power piston 32 is measured to be smaller than the second power piston 52 in diameter, which causes the operation of the first servomotor 30 to occur prior to that of the second servomotor 50.

In the first servomotor 30, the pressure difference between the chambers 31 and 35 displaces the first power piston 32 rightward as seen in the FIGURE against the resilient force of the spring 36, whereby the ball valve 23 closes the hole 25 under the force of the spring 24.

In sequence to the operation of the first servomotor 30, the second servomotor 50 conducts its operation as mentioned previously. The plunger 43 within the capacity controller 40 is moved leftward, as seen in the FIGURE, by the hydraulic pressure within the chamber 41 to increase the capacity of the chamber 41. This decreases the hydraulic pressure being supplied therethrough to the rear wheel brake cylinders 3a to release the locking of the rear wheels 3.

In the above-mentioned operations, the leftward displacement of the second power piston 52 at its initial state makes the rod 83 of the check valve 80 separate from the second power piston 52, whereupon the check valve 80 moves to close the holes 84 under the force of the spring 82. Under this condition, the pneumatic pressure from the air cleaner 12 is supplied into the chamber 51 through the chamber 76 and the smaller orifice 77 to lessen the pneumatic pressure acting on the second power piston 52 in its continuous operation, so that the second power piston 52 properly remains in its operating position.

When a larger locking signal, or the second signal, is issued from the skid sensor 9, the solenoid 74 is additionally energized to urge the plunger 72 of the second selector valve 70 rightward as seen in the FIGURE against the resilient force of the spring 73, whereby the hole 75 opens wider. In this instance, the energization of the solenoid 74 has only to be conducted against the resilient force of the spring 73, since atmospheric pressure does not act directly on the plunger 72 due to the equal effective cross-sectional areas C and D respectively of the valve 71a and the plunger 72. Thus, the releasing operation of the wheel locking is boosted by this additional operation of the second selector valve 70 to accelerate the leftward displacement of the second power piston 52 of the second servomotor 50.

When the larger locking signal from the skid sensor 9 ceases, the solenoid 74 is deenergized even while controlling the anti-skid operation, and the plunger valve 72 closes the hole 75 by way of the spring 73.

Upon the release of the rear wheel locking, the skid sensor 9 stops issuing a locking signal. The solenoids 66 and 74 are then deenergized, which causes the pressure differences within the first and second servomotors 30 and 50 to decrease at the same speed. Only after the plunger 43 of the capacity controller 40 returns completely to its original position does the ball valve 23 of the first servomotor 30 reopen the hole 25, because the resilient force of the spring 56 is larger than that of the spring 36. This mentioned operation renders good response to braking pressure and provides the driver with smooth and pleasant braking operations, as no reaction is felt on the foot brake pedal 100.

In the initial stage of the anti-skid operation, the check valve 80 is kept open. As a result, atmospheric pressure can be swiftly delivered into the chamber 51 of the second servomotor 50 to minimize delays in the operation at the initial stage. Furthermore, the second selector valve 70 can well be regulated in accordance with the locking degrees of the rear wheels 3 so that the releasing operation of the wheel locking can have good and smooth response.

Since the effective cross-sectional areas C and D respectively of the valve 71a and plunger 72 are designed to be equal, the atmospheric or vacuum pressures delivered into the hole 78 of the second selector valve 70 does not work as operation resistance to the plunger 72. Thus, the plunger 72 can be operated only by the force overcoming the resilient force of the spring 73. Consequently, the valve 71a of the plunger 72 can have good response in its operation and the solenoid 74 does not need a big capacity, yet can operate fast and accurately.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed as new and desired to be secured by Letters Patent of the United States is:

1. An anti-skid brake control system for a vehicle having a master cylinder, wheel brake cylinders, a hydraulic braking circuit connecting said master cylinder with said wheel cylinders, cut-off valve means disposed within said circuit for selectively blocking pressure communication between said master and wheel cylinders, and hydraulic capacity control means interposed between said cut-off valve means and said wheel cylinders within said circuit for decreasing braking pressure applied to said wheel cylinders on activation of said cut-off valve means, the combination comprising:
   skid-sensing means for generating first and second signals therefrom in response to predetermined wheel locking conditions;
   first servo-means for pneumatically actuating said cut-off valve means, said first servo-means including a spring loaded diaphragm piston reciprocable therein to establish first and second chambers;
   second servo-means for pneumatically actuating said hydraulic capacity control means, said second servo-means including a spring loaded diaphragm piston reciprocable therein, which is dimensionally larger than said diaphragm piston of said first servo-means, to establish first and second chambers, the former of which is pneumatically in open communication with said first chamber of said first servo-means;
   first pneumatic selector valve means electrically operated by said first signal from said skid-sensing means for connecting said first chamber of said second servo-means with a pneumatic pressure source to activate said diaphragm pistons of said first and second servo-means;
   second pneumatic selector valve means electrically operated by said second signal from said skid-sensing means for connecting said first chamber of said second servo-means with said pressure source during the activation of said first selector valve means so as to provide additional pneumatic communication between said pressure source and said first chamber of said second servo-means; and
   control valve means disposed within a communication passage formed between said first selector valve means and said first chamber of said second servo-means for changing from large to small the amount of communication between said first selector valve means and said first chamber of said second servo-means in response to the initial operation of said diaphragm piston of said second servo-means.

2. An anti-skid brake control system as set forth in claim 1, wherein said second chambers of said first and second servo-means are constantly in open communication with a vacuum source and said first chambers of said first and second servo-means are changed-over from their normal communication with said vacuum source to their operational mode of communication with atmospheric pressure upon activation of said first selector valve means to operate said first and second servo-means.

3. An anti-skid brake control system as set forth in claim 1, wherein said first pneumatic selector valve means comprises:
   a housing provided with a first chamber in open communication with atmospheric pressure, a second chamber in open communication with said first chamber of said second servo-means, and a third chamber in open communication with a vacuum source and normally connected with said second chamber of said housing;
   spool valve means reciprocable within said housing and biased by a spring means to normally block communication between said first and second chambers of said housing and to keep communication between said second and third chambers thereof, said spool valve means including a hermetic diaphragm engaged between the interior wall of said housing and thereon within said third chamber to establish two sections in said third chamber and being designed to have the same effective cross-sectional areas at portions exposed respectively in said first and third chambers of said housing; and
   solenoid means energized in response to said first signal from said skid-sensing means so as to displace said spool valve means against said spring means to its position to cause communication between said first and second chambers of said housing and to block communication between said second and third chambers thereof.

4. An anti-skid brake control system as set forth in claim 1, wherein said second pneumatic selector valve means comprises:
   a housing provided with a bore in open communication with said passage between said first selector valve means and said first chamber of said second servo-means;
   spool valve means sealingly and reciprocably engaged within said housing and normally biased by spring means to close said bore within said passage at its top sealing portion, said spool valve means being provided with an axial hole communicating with said first chamber of said second servo-means through said bore and designed to have the same effective cross-sectional areas at both end portions thereof; and solenoid means energized in response to said second signal from said skid-sensing means to cause displacement of said spool valve means so as to complete the additional communication between said pneumatic pressure source and said first chamber of said second servo-means through said passage during the activation of said first selector valve means to thereby supply a maximum pneumatic pressure into said chamber of said second servo-means.

5. An anti-skid brake control system as set forth in claim 1, wherein said control valve means comprises:

a check valve normally biased by said diaphragm piston of said second servo-means for maintaining the open communication between said selector valve means and said first chamber of said second servo-means;

spring means to bias said check valve to block said open communication in response to the initial operation of said diaphragm piston of said second servo-means; and an orifice provided between said first selector valve means and said first chamber of said second servo-means.

6. An anti-skid brake control system as set forth in claim 1, wherein said second servo-means includes a main body on which are provided housings of said second servo-means, said hydraulic capacity control means and said first and second pneumatic selector valve means being hermetically and integrally formed therewith, said housings of said second servo-means and said first selector valve means forming said communication passage between said first chamber of said second servo-means and said first selector valve means.

7. An anti-skid brake control system as set forth in claim 6, wherein said housing of said second servo-means is provided with first, second and third axial holes therethrough and positioned within said communication passage, said first hole being opened and closed by said second selector valve means to complete and block communication between said first chamber of said second servo-means and said pneumatic pressure source through said communication passage, said second hole being an orifice constantly open to said communication passage, and said third hole being opened and closed by said control valve means so as to open and close said communication passage therethrough.

8. An anti-skid brake control system as set forth in claim 6, wherein said housing of said capacity control means is provided with a chamber interposed between said cut-off valve means and said wheel brake cylinders within said circuit, and said capacity control means comprises a biased plunger reciprocably engaged within said chamber of said housing of said capacity control means and operably engaged with said diaphragm piston of said second servo-means, said plunger normally maintaining said chamber of said housing of said capacity control means in its minimum capacity and increasing the capacity thereof to decrease braking pressure applied to said wheel cylinders when said diaphragm piston of said second servo-means is operated.

9. An anti-skid brake control system as set forth in claim 7, wherein said housing of said first pneumatic selector valve means is provided with a first chamber in open communication with atmospheric pressure, a second chamber in open communication with said first chamber of said second servo-means through said second and third holes, and a third chamber in open communication with a vacuum source and normally connected with said second chamber of said housing of said first pneumatic selector valve means, and said first selector valve means comprises spool valve means reciprocable within said housing thereof and normally biased by spring means to close the communication between said first and second chambers of said housing thereof and to normally to keep the communication between said second and third chambers of said housing thereof, and solenoid means energized in response to said first signal from said skid-sensing means so as to displace said spool valve means against said spring means to its position to open the communication between said first and second chambers of said housing of said first pneumatic selector valve means and to close the communication between said second and third chambers thereof.

10. An anti-skid brake control system as set forth in claim 9, wherein said first selector valve means includes a hermetic diaphragm engaged between the interior wall of said housing thereof and thereon within said third chamber of said housing thereof and is designed to have the same effective cross-sectional areas at portions exposed respectively in said first and third chambers of said housing thereof.

11. An anti-skid brake control system as set forth in claim 7, wherein said second pneumatic selector valve means comprises:

spool valve means sealingly and reciprocably engaged within said housing of said second selector valve means and normally biased by spring means to close said first hole at its top sealing portion; and solenoid means energized in response to said second signal from said skid-sensing means to cause displacement of said spool valve means so as to open said first hole during the activation of said first selector valve means.

12. An anti-skid brake control system as set forth in claim 7, wherein said control valve means comprises:

a check valve normally biased by said diaphragm piston of said second servo-means for opening said third hole;

spring means to bias said check valve to close said third hole in response to the initial operation of said diaphragm piston of said second servo-means; and said second hole.

* * * * *